(12) United States Patent
Jitkoff et al.

(10) Patent No.: US 12,158,917 B2
(45) Date of Patent: *Dec. 3, 2024

(54) STATE-DEPENDENT QUERY RESPONSE

(71) Applicant: Google LLC, Mountain View, CA (US)

(72) Inventors: John Nicholas Jitkoff, Palo Alto, CA (US); Michael J. Lebeau, New York, NY (US); William J. Byrne, Mountain View, CA (US); David P. Singleton, San Francisco, CA (US)

(73) Assignee: Google LLC, Mountain View, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/646,388

(22) Filed: Dec. 29, 2021

(65) Prior Publication Data

US 2022/0121719 A1     Apr. 21, 2022

Related U.S. Application Data

(63) Continuation of application No. 16/810,069, filed on Mar. 5, 2020, now Pat. No. 11,216,522, which is a
(Continued)

(51) Int. Cl.
 *G06F 16/248* (2019.01)
 *G06F 3/16* (2006.01)
 (Continued)

(52) U.S. Cl.
 CPC ............ *G06F 16/9535* (2019.01); *G06F 3/16* (2013.01); *G06F 3/167* (2013.01); *G06F 16/248* (2019.01);
 (Continued)

(58) Field of Classification Search
 CPC ........ G06F 16/9535; G06F 3/16; G06F 3/167; G06F 16/248; G06F 16/3329;
 (Continued)

(56) References Cited

U.S. PATENT DOCUMENTS

| 5,572,728 | A | * | 11/1996 | Tada | ...................... | H04N 7/147 |
|---|---|---|---|---|---|---|
| | | | | | | 715/201 |
| 2007/0233663 | A1 | * | 10/2007 | Ami | ...................... | G06F 16/243 |
| 2010/0114944 | A1 | * | 5/2010 | Adler | .................... | G10L 13/027 |
| | | | | | | 707/E17.062 |

FOREIGN PATENT DOCUMENTS

| CN | 1866169 | 11/2006 |
|---|---|---|
| JP | 2007272463 | 10/2007 |

OTHER PUBLICATIONS

Office Action for the related EP Application No. 16175483.3 dated Nov. 8, 2013.

(Continued)

*Primary Examiner* — Marcin R Filipczyk

(74) *Attorney, Agent, or Firm* — Honigman LLP; Brett A. Krueger; Grant Griffith

(57) ABSTRACT

In general, the subject matter described in this specification can be embodied in methods, systems, and program products for receiving user input that defines a search query, and providing the search query to a server system. Information that a search engine system determined was responsive to the search query is received at a computing device. The computing device is identified as in a first state, and a first output mode for audibly outputting at least a portion of the information is selected. The first output mode is selected from a collection of the first output mode and a second output mode. The second output mode is selected in response to the computing device being in a second state and is for visually outputting at least the portion of the information and not audibly outputting the at least portion of the information. At least the portion of information is audibly output.

20 Claims, 7 Drawing Sheets

Related U.S. Application Data continuation of application No. 15/460,696, filed on Mar. 16, 2017, now Pat. No. 10,621,253, which is a continuation of application No. 15/016,707, filed on Feb. 5, 2016, now Pat. No. 10,496,718, which is a continuation of application No. 12/851,879, filed on Aug. 6, 2010, now Pat. No. 10,496,714.

(51) Int. Cl.

| | |
|---|---|
| *G06F 16/332* | (2019.01) |
| *G06F 16/338* | (2019.01) |
| *G06F 16/638* | (2019.01) |
| *G06F 16/951* | (2019.01) |
| *G06F 16/9535* | (2019.01) |
| *G06F 16/9538* | (2019.01) |
| *G06F 40/186* | (2020.01) |
| *G06F 40/20* | (2020.01) |
| *G06F 40/58* | (2020.01) |
| *G10L 13/00* | (2006.01) |
| *G10L 15/30* | (2013.01) |
| *H04M 1/60* | (2006.01) |
| *H04M 1/72454* | (2021.01) |
| *H04R 29/00* | (2006.01) |
| *G10L 15/22* | (2006.01) |

(52) U.S. Cl.
CPC ........ *G06F 16/3329* (2019.01); *G06F 16/338* (2019.01); *G06F 16/638* (2019.01); *G06F 16/951* (2019.01); *G06F 16/9538* (2019.01); *G06F 40/186* (2020.01); *G06F 40/20* (2020.01); *G06F 40/58* (2020.01); *G10L 13/00* (2013.01); *G10L 15/30* (2013.01); *H04M 1/6041* (2013.01); *H04M 1/72454* (2021.01); *H04R 29/004* (2013.01); *G10L 2015/225* (2013.01)

(58) Field of Classification Search
CPC .... G06F 16/338; G06F 16/638; G06F 16/951; G06F 16/9538; G06F 40/186; G06F 40/20; G06F 40/58; G06F 16/438; G06F 16/3328; G06F 16/3334; G06F 16/345; G06F 16/9038; G06F 16/953; G06F 16/9532; G10L 13/00; G10L 15/30; G10L 2015/225; H04M 1/6041; H04M 1/72454; H04R 29/004; H04N 1/00029; H04N 1/00042
See application file for complete search history.

(56) References Cited

OTHER PUBLICATIONS

Written Opinion issued in European Application No. 11741386.4, mailed on Feb. 26, 2018, 7 pages.
Office Action issued in Korean Application No. 10-2018-7005837, mailed on Mar. 15, 2018, 12 pages (with English Translation).
Decision of Rejection in Korean Application No. 10-2013-7005771, mailed on Jul. 30, 2017, 10 pages (with English Translation).
Authorized Officer K. Sommermeyer. International Search Report and Written Opinion in international application No. PCT/US2011/045566, dated Nov. 30, 2011, 20 pages.
Google Operating System. "Google OneBox Results," Jul. 9, 2006 [Retrieved on Aug. 2, 2010] Retrieved from the Internet <URL: htto:// !!ooi:desvstemblo!! soot.com/2006/07/imo!!leoneboxresults/html> (5 pages).
Siegler, MG. "Let there be voice! Google Voice Search for iPhone launches," Nov. 17, 2008. Retrieved on Aug. 2, 2010] Retrieved from the Internet <URL: /http://social.venturebeat.com/2008/<http://social.venturebeat.com/2008/> 11/17/here-she-is-google-voice-search> (6 pages).
Wikipedia. "GOOG-411," [Retrieved on Aug. 2, 2010] Retrieved from the Internet <URL: <http://en.wikipedia.org/w/index.php?title=GOOG-411> &printable=yes> (2 pages).
International Preliminary Report on Patentability issued in PCT/US2011/045566 on Feb. 12, 2013, 15 pages.
Office Action issued in U.S. Appl. No. 12/851,879 on Dec. 8, 2011, 14 pages.
Office Action issued in U.S. Appl. No. 12/851,879 on Jun. 13, 2012, 18 pages.
Office Action issued in U.S. Appl. No. 12/851,879 on Oct. 26, 2012, 19 pages.
Office Action issued in U.S. Appl. No. 13/249,678 on Dec. 9, 2011, 14 pages.
Office Action issued in U.S. Appl. No. 13/249,678 on Jul. 12, 2012, 25 pages.
Office Action issued in U.S. Appl. No. 12/851,879 on Jul. 29, 2013, 26 pages.
Office Action issued in U.S. Appl. No. 12/851,879 on Apr. 2, 2014, 14 pages.
Office Action in Australian Application No. 2011285995, mailed Jun. 20, 2014, 3 pages.
Office Action in Chinese Application No. 201180044944.3, mailed Apr. 30, 2014, 24 pages.
Office Action issued in U.S. Appl. No. 13/249,678 on Jul. 31, 2014, 32 pages.
Office Action issued in Australian Application No. 2011285995, mailed Aug. 6, 2014, 3 pages.
Office Action issued in in U.S. Appl. No. 12/851,879 on Sep. 18, 2014, 23 pages.
Office Action issued in in U.S. Appl. No. 13/249,678 on Jan. 5, 2015, 18 pages.
Office Action issued in U.S. Appl. No. 12/851,879 on Mar. 18, 2015, 19 pages.
Office Action issued in U.S. Appl. No. 12/851,879 on Jun. 29, 2015, 19 pages.
Office Action issued in U.S. Appl. No. 12/851,879 on Feb. 25, 2016, 17 pages.
Extended European Search Report in European Application No. 16175483.3, dated Oct. 14, 2016, 10 pages.
Extended European Search Report in European Application No. 16175481.7, dated Oct. 14, 2016, 9 pages.
Office Action issued in EPO Application No. 11741386.4, dated Nov. 29, 2016, 12 pages.
Office Action in Korean Application No. 10-2013-7005771 mailed on Jan. 19, 2017, 16 pages.
Office Action in Korean Application No. 10-2016-7017348 mailed on Jan. 19, 2017, 11 pages.

* cited by examiner

STATE-DEPENDENT QUERY RESPONSE

CROSS-REFERENCE TO RELATED APPLICATIONS

This U.S. patent application is a continuation of, and claims priority under 35 U.S.C. § 120 from, U.S. patent application Ser. No. 16/810,069, filed on Mar. 5, 2020, which is a continuation of U.S. patent application Ser. No. 15/460,696, filed on Mar. 16, 2017, which is a continuation of U.S. patent application Ser. No. 15/016,707, filed on Feb. 5, 2016, which is a continuation of U.S. patent application Ser. No. 12/851,879, filed on Aug. 6, 2010. The disclosures of these prior applications are considered part of the disclosure of this application and are hereby incorporated by reference in their entireties.

TECHNICAL FIELD

This document generally describes techniques, methods, systems, and mechanisms for performing computerized searches for information.

BACKGROUND

Users of certain mobile computing devices, such as an application telephones or smartphones, can provide spoken input to their devices. For example, a user can press a button and speak a query "San Francisco Pizza Places" in order to be provided with a list of search results that identify pizza places in San Francisco. The user may also provide textual input, for example, using a physical or virtual keyboard. The mobile telephone may include a display device for providing a visual display of the search results to the user. The mobile telephone may also include one or more speakers for audibly providing information to the user. For example, the speaker may output audio from a telephone call or music.

SUMMARY

This document describes techniques, methods, systems, and mechanisms for performing state-dependent query response. In one instance, a system can determine whether to provide a response to a user visually, audibly, or both, depending on a context of a mobile computing device. For example, a user of the mobile computing device may use the computing device to submit a voice or text query to a server system. The server system may identify search results that are responsive to the query, and may transmit the search results to the mobile computing device. The server system may also generate a summarized query response that provides an answer to the query without the user providing additional user input after submission of the query. The summarized response may be formatted to be provided audible (e.g., the summarized response may be shortened from what would be provided visually, and may have data translated into speakable prose that communicates the data in an understandable manner). The mobile computing device may audibly output a response to the query if the server system returns a summarized query response, and if the mobile computing device is in a predefined state. The summarized query response may represent audibly what a user can be provided visually in a GOOGLE One Box search result.

In various examples, the mobile computing device is in the predefined state if a proximity sensor in the mobile computing device detects an object as being near the proximity sensor, or if an aftermarket external speaker and microphone system are connected to the mobile computing device. For example, if a device is determined to be near a user's ear or in a particular type of dock, a system may determine that audible output is desirable (because the user cannot see the screen or needs to keep their eyes on the road) and may automatically select to provide output in an audible format instead of or in addition to a visual format. In various examples, the search results are visibly output, but are not audibly output. In various examples, the summarized query response is visibly output in addition to being audibly output.

In general, one aspect of the subject matter described in this specification can be embodied in a computer program product that is tangibly embodied in a computer-readable storage medium and includes instructions that when executed by a processor perform operations. The operations include receiving, by a computing device, user input that defines a search query, and providing the search query to a server system that is remote from the computing device. The operations include receiving, by the computing device, information that a search engine system at the server system determined was responsive to the search query. The operations include identifying, by the computing device, that the computing device is in a first state, and in response, selecting a first output mode that is for audibly outputting at least a portion of the information. The first output mode is selected from a collection that comprises the first output mode and a second output mode. The second output mode is selected in response to the computing device being in a second state and is for visually outputting at least the portion of the information and not audibly outputting the at least portion of the information. The operations include audibly outputting, by the computing device and as a result of the identifying, at least the portion of the information.

Another aspect of the subject matter described in this specification can be embodied in a computer implemented method. The method includes, receiving, by a server system and from a computing device, a search query that was input to the computing device by a user. The method includes determining, by the server system, search results that identify documents that are responsive to the search query. The method includes generating, by the server system, a summarized query response that is responsive to the search query based on information from one or more of the documents that are responsive to the search query. The summarized query response is generated based on a template that is different than a template that was used to generate the search results. The method includes providing, by the server system and to the computing device, the search results and the summarized query response. Providing the search results and summarized query response causes the computing device to determine that the computing device is in a first state, and in response, select a first output mode that is for audibly outputting at least the summarized query response. The first mode is selected from a collection of the first output mode and a second output mode, wherein the second output mode is selected in response to the computing device being in a second state and is for visually outputting at least the search results and not audibly outputting the summarized query response. Providing the search results and summarized query response causes the computing device to audibly output at least the summarized query response.

In yet another aspect, the subject matter described in this specification can be embodied in a computer-implemented system. The system includes a search query interface to receive from a server system information that is responsive to a search query. The information includes (i) multiple search results that identify documents that are responsive to the search query, and (ii) a summarized query response that is in addition to the multiple search results, and that is generated from content of a document that is responsive to the search query. The system includes a computing device state determiner that is programmed to identify whether the computing device is in a first state or a second state. The system includes a query result presenter to select for output a stored visual representation of the multiple search results if the computing device is determined to be in the first state, and to select for output a stored audible representation of the summarized query response if the computing device is determined to be in the second state. The system includes audio and visual output devices for selectively outputting a visual representation of the multiple search results and an audible representation of the summarized query response based on the output that is selected by the query result presenter.

These and other implementations can optionally include one or more of the following features. The received user input that defines the search query may be provided with a keyboard. Identifying that the computing device is in the first state may include determining that an external speaker and an external microphone have been placed in communication with the computing device by a user of the computing device. Identifying that the computing device is in the first state may include determining, using a sensor of the computing device, that the computing device is proximate to an object that is recognized by the computing device.

The computing device may be determined to be in the second state when the computing device is determined to not be proximate to an object. The computing device may be in the second state when the user input that defines the search query is received. The information may include a summarized query response that is responsive to the search query and that includes a human-readable prose sentence that was constructed using (a) a sentence template that includes predefined words and (b) content from a document that was identified as being responsive to the search query.

The information may include multiple search results that each identify a document that is responsive to the search query. The multiple search results may not include a human-readable prose sentence that was constructed using (a) a sentence template that includes predefined words and (b) content from a document that was identified as being responsive to the search query. The audible output may be based on the human-readable prose sentence. The summarized query response may be visually output in a display. The display may include a user-selectable prompt. The search results may be displayed in response to selection of the prompt. The search results may not be audibly output in response to selecting the prompt. The search results may be visually displayed after the audible output and in response to receiving user input selecting the prompt.

The search results may not be visually displayed before receiving the user input selecting the prompt. A visual display of both the summarized query response and the multiple search results may be provided. The summarized query response may be audibly output without receiving user input subsequent to receiving the information. The multiple search results may not be audibly output without user input being provided subsequent to receiving the information. The identification that the computing device is in the first state may not depend on whether the computing device was in the first state or the second state when the search query was received.

Generating the summarized query response may include selecting data from one or more predesignated fields in the one or more documents, and placing the information into slots in a template that includes predefined words, so as to generate a human-understandable sentence that is constructed from both predefined words and the data from the one or more predesignated fields. The summarized query response may be generated by the server system in response to identifying that the search query is in a defined list of search queries for which the summarized query response is to be generated. The summarized query response may be generated by the server system in response to identifying that one or more documents from which the summarized query response is constructed is a determined search result.

The query result presenter may not select for output the audible representation of the summarized query response when the computing device is in the first state. The query result presenter may select for output a visual representation of the summarized query response when the computing device is in the second state. The visual output device may not output a visual representation of either the search results or the summarized query response when the computing device is (i) in the second state and (ii) outputs the audible representation of the summarized query response.

Particular embodiments can be implemented, in certain instances, to realize one or more of the following advantages. A portion of a response to a query can be audibly output to a user if a mobile computing device is determined to be in a state where audible output is advantageous. User safety may be increased as the user may be able to keep his eyes on a current task without looking at a display of the mobile computing device. The audibly output information may be a subset of the query response that is particularly relevant, so that a user is not overwhelmed with audible output of all information that is responsive to a query.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
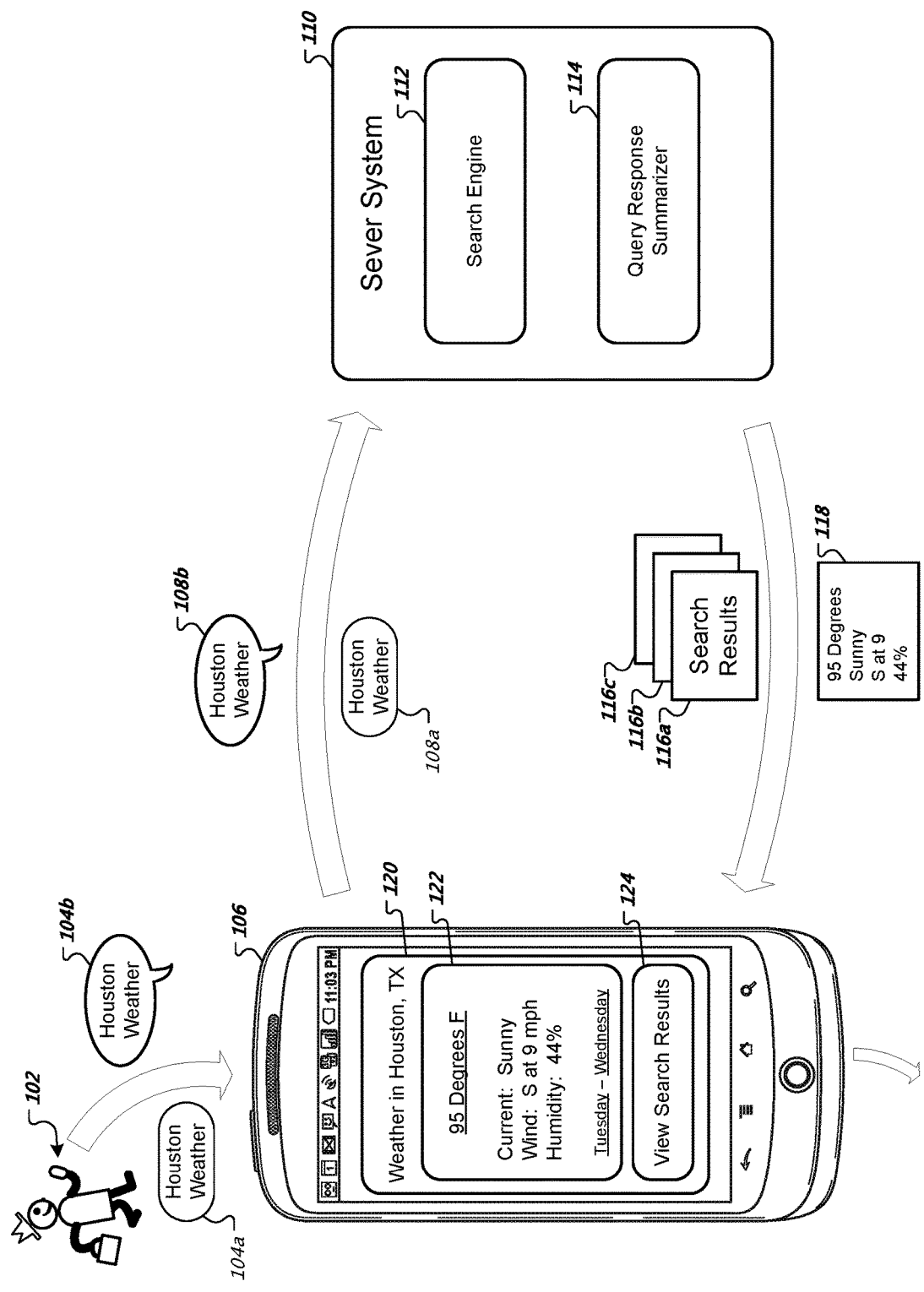
FIG. 1 is a schematic view that conceptually illustrates a state-dependent query response.

This document generally describes state-dependent query response. A user of a computing device may provide a text or voice query to the computing device. The computing device may submit the query to a server system that includes a search engine for identifying documents that are responsive to the query. The server system may also generate a summarized query response that responds to the query, and that is based on data in one or more of the identified documents. The summarized query response and search results that correspond to the identified documents may be transmitted to the computing device.

The computing device may determine if the device is in a state for providing information audibly. If so, the summarized query response may be audibly output to the user of the mobile computing device. If not, the summarized query response may be visibly output to the user of the mobile computing device (and may not be audibly output). The search results may be presented audibly or visibly, either automatically or upon receiving user-input that is for requesting presentation of the search results.

As an illustration, a user of a mobile telephone, Susan, may be riding the bus home from work. Susan may be interested in figuring out the title to a song that is being played over the bus loudspeakers. Susan pulls out her telephone, selects a button for typing a web query, and types the query "lyrics you could travel the world but nothing comes close to the golden coast."

Susan's telephone transmits the query to a search engine system, which identifies web pages that are responsive to the query, and selects the corresponding search results. The search results are transmitted to Susan's mobile telephone which visibly displays the search results. Each of the displayed search results includes a title of the corresponding webpage, a portion of text from the body of the web page, a link to the web page, and a uniform resource identifier (URI) for the web page. Susan is able to tell, from the titles of the search results, that the song being played over the bus speakers is "California Gurls," by Katy Perry.

Susan hears a DJ announce over the bus speakers that the stock market fluctuated significantly during the day. Susan is interested in how some of her stocks did. Accordingly, Susan selects a query-input text box that is being displayed by her mobile computing device, and uses the device's keyboard to submit the query "stock TGT," where TGT is the ticker symbol for TARGET CORP. In response to submission of the query, Susan's mobile telephone displays a list of search results for web sites. At the top of the list of search results, however, is a summarized query response about TARGET CORP. stock.

The summarized query response includes a visual graph of the stock's price throughout the day, the stock's present price, the stock's opening price, the stock's percent change from the opening price, the stock's high and low prices during the day, the stock's volume during the day, and the market capitalization of the company. Some of the information in the summarized query response may be generated by the server system and unique to the query (e.g., the bar graph may not be the same among all stock queries, and while being based off of data from a third-party website, the graph itself may have been generated by the server system).

The summarized query response may appear visually different than the search results. The summarized query response may be generated based on a template that identifies a structural presentation of the summary, wherein the structural presentation of the summary is different than a structural presentation of the search results. The display of the summarized query response (e.g., the characteristics of the graph, and the stock's prices) may be defined by the content of one or more documents that are identified by the search results that are displayed in the list. Thus, the summarized query response may display information that is particularly relevant for the query, and that is in a first view of information that is displayed to Susan as being responsive to the search result. Susan may otherwise need to select a search result to see such information. Instead, the information may appear at a top of the search result page in an easy-to-read format.

In some examples, a summarized query response for stock data appears in response to specific queries (e.g., the word "stock" and a ticker symbol in a single query, or a ticker symbol by alone as a query). The stock summary may be populated with information from a particular web document (e.g., the "TGT" page of www.stocks.com). In some examples, the stock summary appears when a search result for the particular web result is one of the top five search results to a query. Thus, a web site (e.g., www.stocks.com) may be designated as particularly relevant for a given query, and when a search result for a particular web document at that web site appears as a search result (e.g., the TGT page), data may be pulled from the particular web document, and may be used to populate portions of the summarized query response.

Susan may find the summary of stock information useful, and based on use of the searching system, may know that summaries of information appear for at least some queries from which a specific "answer" is discernable. The summaries may appear for queries where a website has a database that provides an "answer" to a variety of variations of the query. For example, a summary may appear in response to a user typing a movie name. The summary may show the movie length, motion picture rating, a summary of user reviews, and a text input box for finding show times near the user.

Summarized query response may appear and provide a definition for a word in a query when a user types, as a query, the word "define" or "definition" along with another word. In various examples, summaries may display information about a musical artist when a query includes the musical artist's name. Summaries may display travel information when a user submits a query that includes a flight name. Summaries may display a current time at a geographical location when a user types a query that requests a time for the location, for example, when a user types "time in London." Summaries may display tracking information for a mailed package when a query includes a number that the server system identifies as a tracking number for a delivery. Summaries may display a response to a numerical calculation when the query includes an unanswered numerical calculation (e.g., 5+4).

Susan's bus has now reached a parking lot where she parks her car during the day. Susan leaves the bus, and on the way to her car, types "stock WMT," where WMT is the stock ticker for WAL-MART STORES INC. Susan presses a query "Submit" button as she reaches the car, and thereafter places her mobile telephone in a telephone dock that she has installed in her car.

As before, Susan's mobile telephone submits the query to a server system, and receives from the server system a summarized query response for WMT stock, and a list of search results. This time, however, Susan's mobile telephone detects that her telephone is placed in a dock. In response, Susan's mobile telephone determines that at least a portion of the information that is responsive to the search query should be audibly output.

Susan's mobile telephone uses another template to convert the summarized query response for the WMT stock to an audio form. Accordingly, Susan's car speakers state "The current stock price for WAL-MART STORES, INCORPORATED is fifty-one dollars and forty-one cents, a zero point two percent loss over today's opening price of fifty-one dollars and fifty-five cents."

Susan's mobile telephone may display the same screen as if she had not placed the mobile telephone in the dock. However, with the mobile telephone placed in the dock, the summarized query response is audibly output. In some examples, the audible output includes the search results. In some examples, the audible output includes the search results only after receiving user-input from Susan. Thus, Susan's mobile telephone may selectively output portions of information that are responsive to search queries (i) when search queries yield a summarized query response, and (ii) when the mobile telephone is in a state for presenting information audibly (e.g., when the mobile telephone is in a dock, the mobile telephone is near a user's ear, or a Bluetooth device is wirelessly connected to the mobile telephone).

In various examples, the audible output does not occur when the information that is received in response to a search query does not include a summary of information, or when the mobile telephone is not in a state for presenting information audibly. The audible output may be requested by the search application on the mobile telephone, or by resources that are received from the searching system. Accordingly, the audible output may not be in response to a "global" mode by which multiple applications on the mobile telephone are triggered into a mode to output information audibly instead of, or in addition to, visually. The audible output may be particular to the output of information that is responsive to the search query.

In some examples, Susan's mobile telephone may not audibly output the search results. Thus, if Susan wants to view information about the search results, she may need to look at the display of the mobile telephone. In some examples, the search results may not be displayed on the mobile telephone and Susan may need to provide tactile or audible user-input that prompts the mobile telephone to display the search results. The search results may be audibly output to Susan in response to the tactile or audible user-input.

FIG. 1 conceptually illustrates a state-dependent query response. In this illustration, a user 102 submits a query 104a or 104b to a mobile telephone 106. The mobile telephone 106 transmits the query to a server system which returns search results 116a-c and a summarized query response 118. The mobile telephone 106 provide a visual display of the summarized query response 118 in a summary output box 120. The mobile telephone 106 has also determined that the mobile telephone is placed in close proximity to an object (e.g., the user's ear). Thus, the mobile telephone 106 presents an audible output of the summarized query response 118.

In more detail, the user 102 can submit a query 104a or 104b to the server system 110 using either textual input or voice input, respectively. For example, the user 102 may press his finger on a touchscreen display of a query-input text box. Upon selection of the query-input text box, the user may use a real or virtual keyboard to type a query for submission to the server system 110.

In another example, the user 102 may submit a voice query. For example, the user 102 may select a physical button on the side of the mobile telephone 106, await an acknowledging "beep," speak into a microphone of the mobile telephone 106, and release the physical button. In another example, the user 102 may select a user interface element that depicts, on the touchscreen of the mobile computing device 106, a microphone. The user 102 may speak, and the mobile telephone 106 may record until the mobile telephone 106 determines that the user 102 is no longer speaking.

The mobile telephone 106 may transmit the text query 108a or the received voice query 108b to the server system 110 over a network (e.g., the internet). The server system 110 may include a search engine 112. The search engine 112 may identify search results that are responsive to the search query 108.

The query response summarizer 114 may identify a summarized query response that is responsive to the search query. For example, if the query is one of multiple pre-designated queries, or if any of the search results that are identified by the search engine 112 identify a pre-designated document, the summarized query response may be generated based on content in the pre-designated document.

The summarized query response may include some information that is specified by a template, and some information that is pulled from one or more of the search results (or the one or more documents that correspond to the search results). The template may be structurally different than a template that is used to generate the search results.

The search results 116a-c and the summarized query response 118 may be transmitted from the server system 110 to the mobile computing device 106. The mobile computing device may determine that the information that is received in response to the search query includes a summarized query response 118. Thus, instead of displaying the search results 116a-c, the mobile telephone may display a dialog box 120 that presents the summarized query response 118. The dialog box 120 may include a title that states "Weather in Houston, TX," and may include snippets of information that describe the weather in Houston.

The mobile telephone 106 may further determine that the mobile telephone is in a state that is for outputting at least some information audibly. Thus, the mobile telephone may audibly output the summarized query response 118 (e.g., by outputting audibly a portion of the information that is included in the summarized query response 118). In this example, the mobile telephone 106 has output "The Weather in Houston, Texas is Ninety-Five Degrees and Sunny." The speech that is output may be synthesized at the mobile telephone 106 based on the summarized query response 118. In some examples, synthesized speech is sent with or instead of the summarized query response 118. In some examples, the mobile computing device 106 requests that the server system 110 provide synthesized speech for the summarized query response 118, which the mobile computing device 106 may have already received.

In either case, the mobile computing device 106 or the server system 110 may generate the synthesized speech using a speech template. An example speech template is: "The Weather in <location> is <temperature> degrees and <current forecast>," where the variables are pulled from the summarized query response 118. In various examples, an audible output of the summarized query response 118 is generated by the mobile computing device 106, and the visible output of the summarized query response that is presented in the dialog box 120 is not shown while the mobile telephone is in the state for audibly outputting information.

Although this document discusses not only transmitting search results and summarized query responses, but also visually and audibly outputting the search results and summarized query responses, the transmission and output of the data may be different in content. For example, the information that is transmitted as a summarized query response may include mark-up code and textual data. When the summarized query response is displayed, the mark-up code may not be displayed, and the textual data may be displayed. When the summarized query response is audibly output, portions of the textual data may be audibly output as synthesized speech, and may include additional words for improving sentence flow. For clarity, this document describes the transmission, receipt, and output of search results and summarized query responses, even though the described content may be different. Regardless, all representations of the search results and summarized query responses may originate from the same transmitted search results or summarized query responses.

Figure 2:
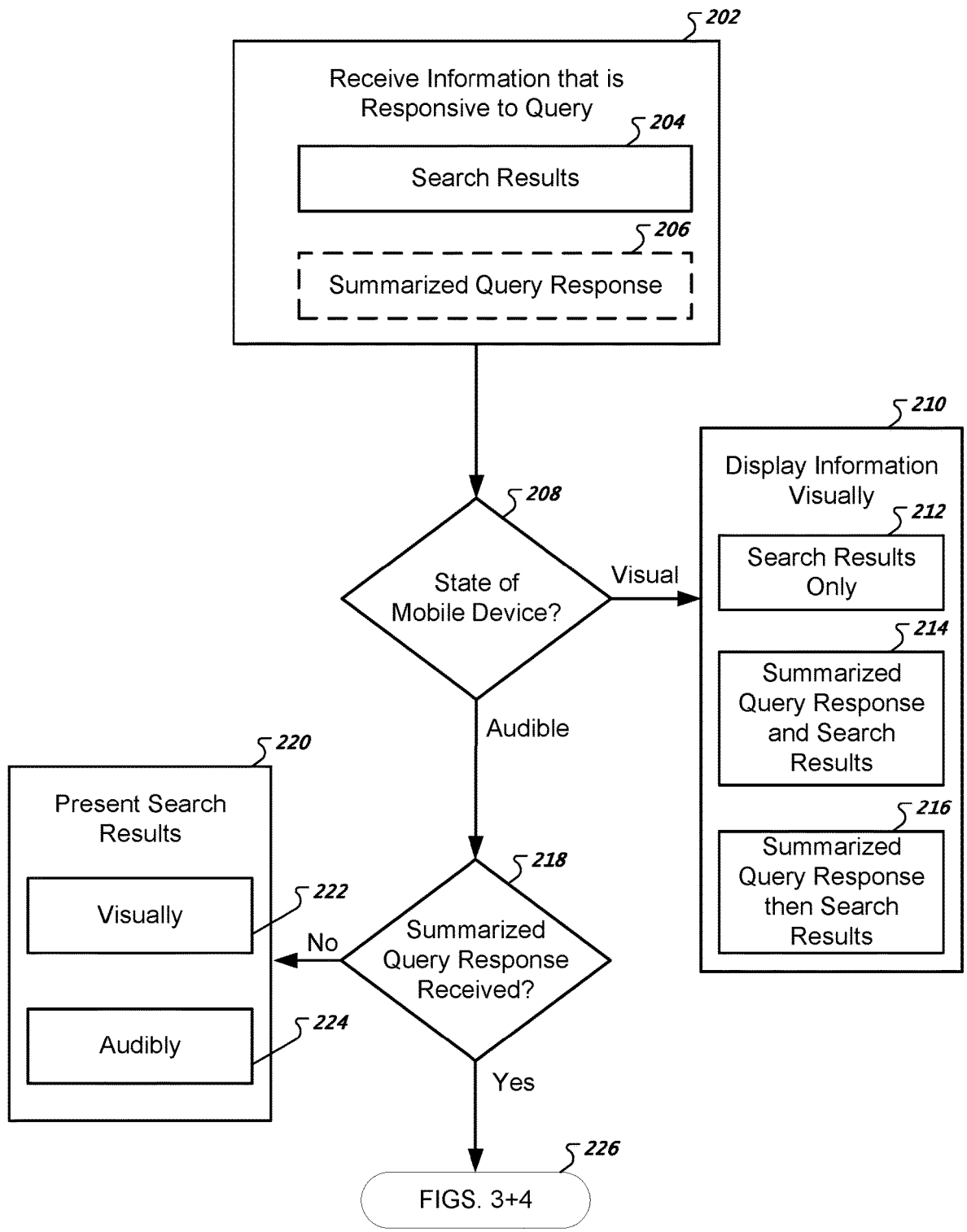
FIG. 2 is a flowchart for performing state-dependent query response.

FIG. 2 is a flowchart for performing state-dependent query response. In box 202, a mobile computing device receives information that is responsive to a query. The information may be received from a server system, and may have been generated by the server system in response to a voice query or textual query that was defined by a user of the mobile computing device and that was submitted to the server system as a query.

The information may include multiple search results 204. Each search result may identify a single web document and provide a block of text illustrating a content of the web document. The information may also include a summarized query response 206. The search results and summarized query response may be received together within an HTML, web document that is provided to the mobile computing device in response to the search query. In various examples, the search results 204 and the summarized query response 206 are received separately at the mobile computing device in response to separate requests by the mobile computing device.

In box 208, a determination is made whether the mobile computing device is in a visual state or an audible state. The mobile computing device may be determined to be in the audible state when a proximity sensor in the mobile computing device detects that an object is near to the proximity sensor. An object being near to the proximity sensor may indicate that the mobile computing device is face down, in a user's pocket, or up to a user's ear (so that a user cannot see the screen). In some examples, a light sensor is used to determine if the mobile telephone is near an object (e.g., because not as much light may reach the sensor when the sensor is up against to or near to an object as when the object is held out in the open).

In various examples, a phone is determined to be in the audible state when a motion sensor (e.g., an accelerometer or a gyroscope) indicates that the phone was moved in a predetermined way before the proximity sensor indicated that the mobile computing device was near an object. For example, an upward motion may need to be detected in order for the mobile telephone to be in a state that indicates that the mobile telephone is at a user's ear (in conjunction with the proximity sensor indicating that an object is near the proximity sensor). In another example, a horizontal flipping motion may need to be detected to indicate that the mobile telephone is flipped over onto a surface (in conjunction with the proximity sensor indicating that an object is near the proximity sensor).

In some examples, the mobile computing device may be determined to be in the audible state when the mobile computing device is docked. The mobile computing device may be docked when a female port of the mobile computing device is placed in communication with a cooperating male terminal. The mobile computing device may communicate with electronics in the dock to identify that the male terminal is indeed a male terminal of a dock, and a type of the dock. In some examples, the port is not an audio input and output jack for headphones. The port may be used, at least in part, for charging the mobile computing device.

In some examples, the mobile computing device may be determined to be in the audible state when an external speaker and microphone are communicatively connected to the mobile computing device. An external speaker and microphone may be a speaker and microphone that may be connected, physically or wirelessly, to the mobile computing device, but that are not shipped as connected to the mobile computing device, and that are in addition to the microphone and speaker that are manufactured as part of the mobile computing device. Upon attaching the external speaker and microphone, the mobile computing device's default speaker and microphone may turn off.

Example external speakers and microphones include one-ear Bluetooth headsets that may wirelessly communicate with the mobile telephone for playing audio to a user and for receiving voice input. Another example includes wired headphones that connect to the mobile telephone through the mobile telephone's audio input jack.

The mobile computing device may be determined to be in a visual state when the mobile computing device has not been determined to be in the audible state. Thus, the default state for the mobile computing device may be the visual state.

In box 210, the mobile computing device has been determined to be in the visual state, and thus displays the received information visually. In examples where the received information does not include a summarized query response, but does include search results, the mobile computing device may only display search results (box 212). In examples where the received information includes both a summarized query response and search results, the mobile computing device may concurrently display the summarized query response (or a representation thereof, as described above) and the search results (e.g., in a single webpage in a web browser) (box 214). Also, in examples where the received information includes both a summarized query response and search results, the mobile computing device may first display the summarized query response and then, after a period of time, display the search results (box 216). The search results may be displayed after the user provides user-input that invokes a display of the search results.

In box 218, the mobile computing device has been determined to be in an audible state, and a determination is performed whether a summarized query response has been received as part of the information that is received in response to the query. For example, a summarized query response may be part of the received information if the search query was for a predesignated query (e.g., a query that included the word "weather" and a location), or if the search results that identified as responsive to the search query included a predesignated search result (e.g., a search result that is for the "weather.com" webpage, and that presents weather for a specific location). Otherwise, the received information may include only search results (and no summarized query response), or may not include a summarized query response of a particular type that is necessary for a positive determination in box 218.

In box 220, the mobile computing device has not received a summarized query response, and thus, the search results are presented. The search results may be presented visually (box 222) or audibly (box 224).

In box 226, the mobile computing device is in an audible state and has received a summarized query response. Accordingly, the operations described in relation to FIGS. 3 and 4 are performed.

Figure 3:
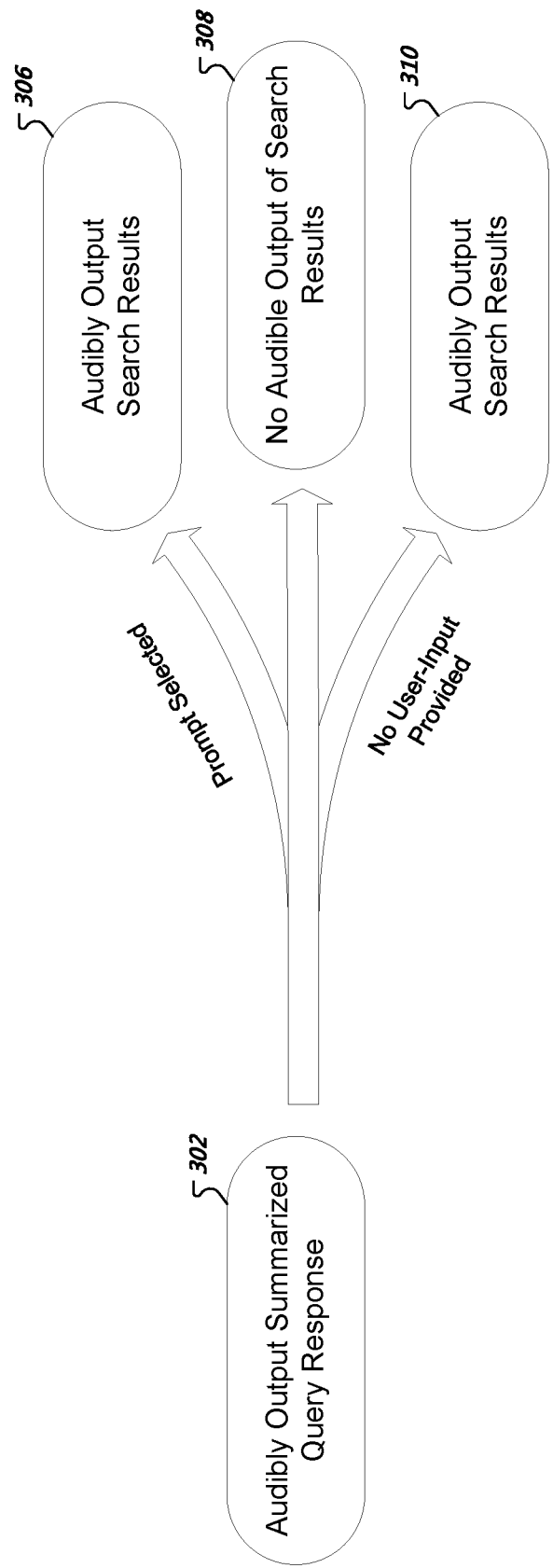
FIG. 3 is a schematic view that illustrates audible output transitions for a computing device.
Figure 4:
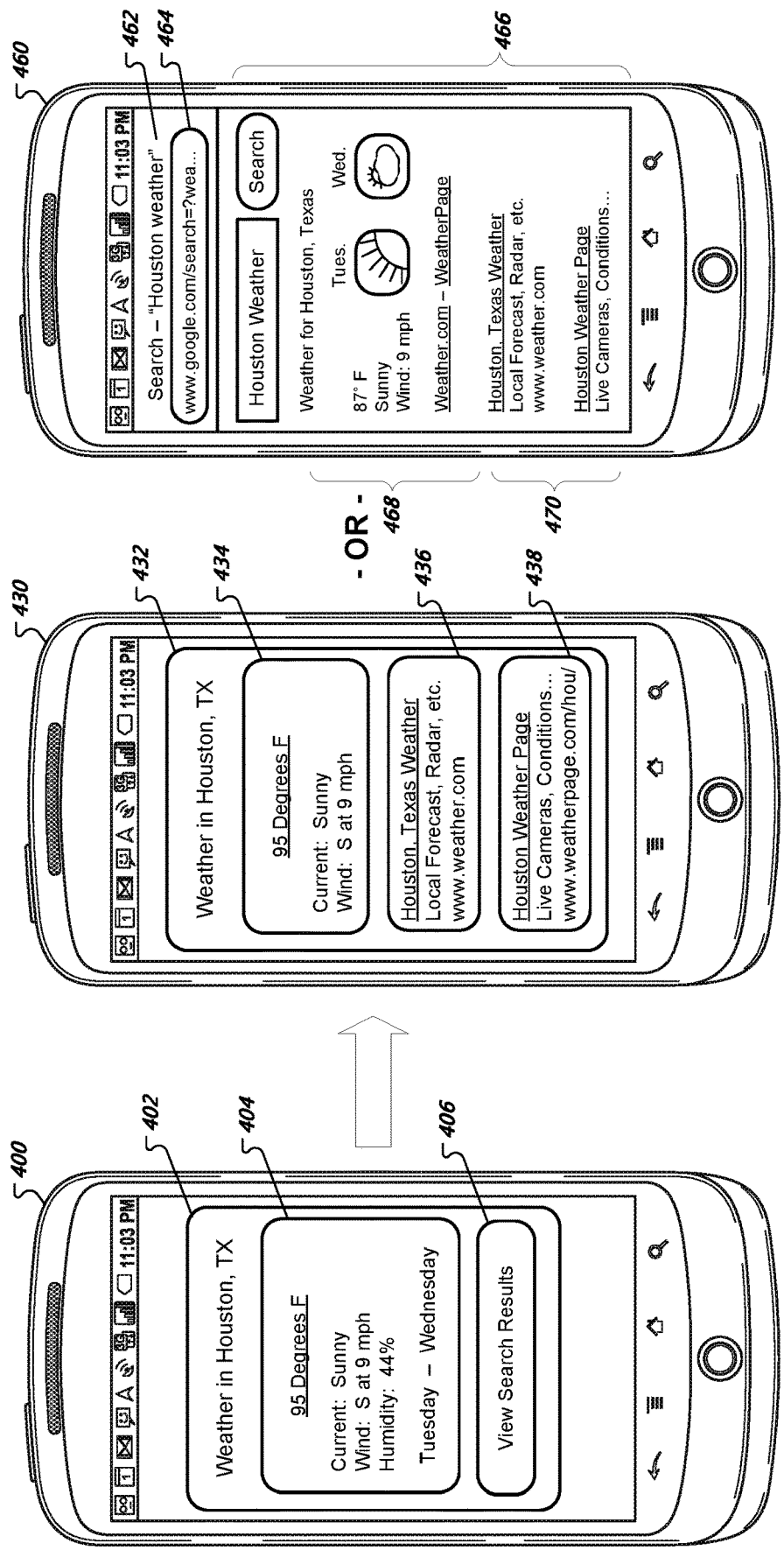
FIG. 4 is a schematic view that illustrates visual output transitions for a computing device.

FIG. 3 illustrates audible output transitions for a computing device. The mobile computing device may have been determined to be in a state for audible output and may have been determined to have received a summarized query response (as referenced in FIG. 2). In box 302, the summarized query response is audibly output. For example, a mobile computing device may "speak," in response to a query "define connote," the words "Definition for connote . . . imply, to express or state indirectly." As described throughout this document, the audible speaking may be performed with, or without, a corresponding visual presentation that is representative of the summarized query response.

In box 308, the mobile computing device does not provide an audible output of the search results. Instead, the search results may only visually output to the user.

In box 306, the mobile computing device audibly outputs the search results (or a representation thereof) in response to user selection of a prompt. For example, upon the mobile computing device stating the definition for "connote," the mobile computing device may state "Say 'search results' to listen to the search results for your query 'definition connote.'" In response to the user stating "search results," the mobile computing device may "speak" summaries of several search results (e.g., the titles, and portions of the selections of text for each search result). In some examples, the search results may be "spoken" by the mobile computing device in response to the mobile computing device receiving physical user-input (e.g., user-selection of a physical button or a user interface element on a touchscreen).

In box 310, the mobile computing device audibly outputs the search results without user selection of a prompt. In contrast to box 306, the audible output may occur without the user providing user input. For example, after the mobile computing device states the summarized definition for Connote, the mobile computing device may state "First search result . . . definition of connote by free dictionary online . . . to suggest in addition to literal meaning . . . say 'first' to select . . . ," "Second search result . . ." and so forth. The search results may be audibly output without user input that prompts the output of the search results.

FIG. 4 illustrates visual output transitions for a computing device. The mobile computing device may have been determined to be in a state for audible output and may have been determined to have received a summarized query response (as referenced in FIG. 2). In various examples, the various visual output transitions that are described below may occur in any combination with the audible output transitions described with reference to FIG. 3.

Mobile computing device 400 is displaying a dialog box 402 that was displayed in response to submission of a search query and receipt of information that is responsive to the search query. The dialog box 402 visually presents a summarized query response. The query box is titled "Weather in Houston, TX" and includes a details box 404 that includes a summary of data on the present weather in Houston, Texas. In this example, the mobile computing device 400 is not displaying any of the search results, but includes a "View Search Results" graphical interface element 406 for causing the mobile computing device to display search results.

Upon user selection of the "View Search Results" graphical interface element 406, the display of mobile computing device 430 may be presented. The dialog box 432 may have expanded to include additional information. For example, the "View Search Results" interface element 406 may have been replaced by search result 436 and search result 438. In this example, the details box 434 may have shrunk and may not include as much information as the details box 404. In some examples, the details box 434 includes the same information as the details box 404. A user of the mobile computing device 430 may be able to scroll down the display and view additional search results.

As an alternative to the display of mobile computing device 430, upon user selection of the "View Search Results" graphical interface element 406, the display of mobile computing device 460 may be presented. In this example, the display presents a web browser that has rendered a web page. The title bar 462 of the web browser displays the query that was used in the search. In this example, the title bar states "Search—'Houston weather'" because the content of the text or voice query was "Houston weather." The web browser also presents an address bar 464 for displaying the URI for the webpage that has been rendered.

The body portion 466 of the web page displays content that is rendered based on resources that are received in response to submission of the query. A top portion 468 of the web page displays a summarized query response for the query "Houston weather." The summarized query response may be structured according to a template, may include predefined words from the template, and may be structured differently than the search results that are displayed in a bottom portion 470 of the web page.

In various examples, the summarized query response is not displayed in a dialog box 402 as presented by mobile computing device 400. In such examples, the first display of information that is presented in response to submission of a search query is either the display of mobile computing device 430 or mobile computing device 460.

The various visual output transitions of FIG. 4 may be combined with any combination of the audible output transitions of FIG. 3. For example, the audible output summarized query response (box 302) may be output during the display of mobile computing device 460, and the display of mobile computing device 460 may remain as the audible output transitions to output the search results (box 310). As another example, the audible output summarized query response (box 302) may be output during the display of mobile computing device 400, and no audible output of search results (box 308) may occur upon user-selection of the "View Search Results" interface element 406 (and the visual transition to the display of mobile device 430 or mobile device 460).

Figure 5:
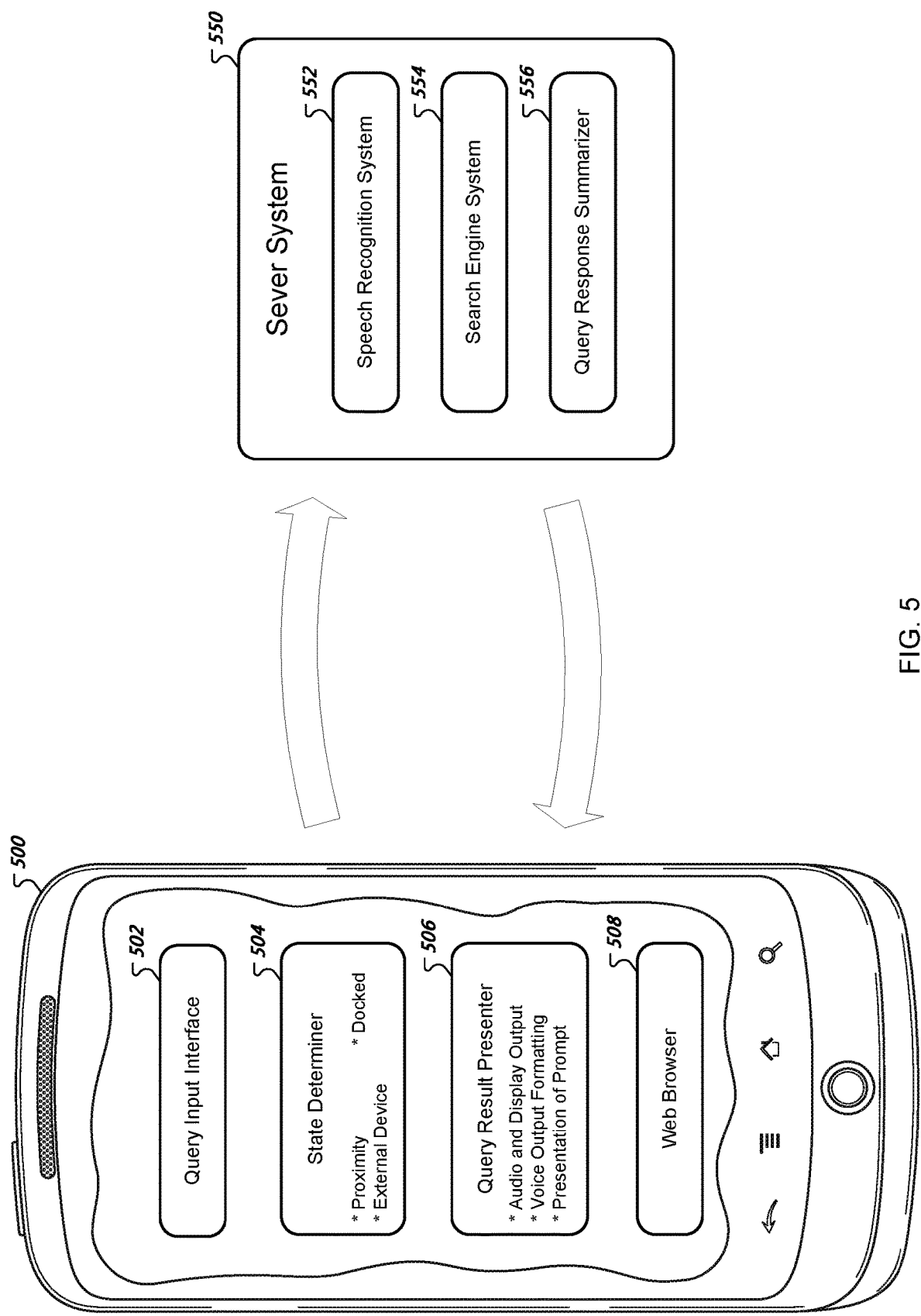
FIG. 5 is a schematic view of an example system for performing state-dependent query response.

FIG. 5 is an example system for performing state-dependent query response. The system includes a mobile computing device 500 and a server system 550. The mobile computing device communicates with the server system 550 over a network, for example, the internet.

Mobile computing device 500 includes a query input interface 502. The query input interface 502 performs operations for receiving user-definition of queries at the mobile computing device. For example, the query input interface 502 may perform operations for recording an audio file of a user-spoken query in response to a user pressing a button. In another example, the query input interface 502 may record key strokes entered by a user into a text field that is designated for a search query. The query input interface 502 may transmit the recorded audio file or keystrokes to the server system 550. In some examples, the query input interface 502 receives information that is responsive to the submitted query, and passes the received information to the state determine 504, the query result presenter 506, or the web browser 508.

The server system 550 includes a speech recognition system 552 for determining a transcription of the recorded audio file of the spoken voice query. The speech recognition system 552 may access a language model to probabilistically determine textual words that correspond to spoken words in the recorded audio file. The speech recognition system 552 may output textual words in a human-understandable language.

The search engine system 554 may receive a search query in textual form and identify search results that are responsive to the search query. For example, the search engine system 554 may include a web crawler that visits websites on the internet and collects, parses, and stores data from the websites to generate an index that facilitates fast and accurate information retrieval. The search query is run against the index to identify a ranked set of documents that are relevant to the search query. The search engine system 554 provides, for transmission to the mobile computing device 500, a corresponding set of search results that each identify information a document.

The query response summarizer 556 determines whether a summarized query response should be generated for the query, and if so, generates the summarized query response. A summarized query response is a set of information that is generated by the query response summarizer 556 for display to a user of the mobile computing device 500. The summarized query response may "answer" a query so that a user of the mobile computing device 500 may need not select a search result to obtain an answer to the query. Accordingly, the summarized query response may be generated using a template that a developer of the content summarizer 556 has generated, where the template includes "slots" for data that is drawn from a specified information resource.

As an example, a summarized query response may be generated when a search query is "definition marmot." The summarized query response may include HTML code that, when rendered by the mobile computing device 500, presents a display of information that "answers" the query. For example, the display of the summarized query response may include a title that states "Definition for Marmot," an icon that depicts a dictionary, the textual definition "stocky coarse-furred burrowing rodent with a short bushy tail," and a URI that identifies a source of the definition. In this example, the title may include a human-understandable sentence "Definition for Marmot" that is partially generated using words from the template, "Definition for," and partially generated using a word that is identified by the query, "Marmot." In some examples, the human-understandable sentence is partially generated using words from a source of the definition.

In contrast, the search results may be structured differently than the summarized query response, and may be generated using a template that is different than the template for the summarized query response. The server system 550 may generate a single summarized query response for a query, but may identify multiple search results that are responsive to the summary. The title for each of the search results may be defined by the search result, while the title for the summarized query response may be defined, at least in part, by the template for the summarized query response. The source of content for the summarized query response may be one of the documents that are identified as responsive to the search query, and for which a search result has been displayed.

The server system 550 may transmit the search results and the summarized query response to the mobile computing device 500. In response to receiving the search results and the summarized query response, the state determiner 504 may determine a state of the mobile computing device 500. In some examples, the search results and summarized query response are transmitted as part of a web page that includes information that causes the mobile computing device 500 to request that the state determiner 504 determine a state of the mobile computing device 500. In some examples, the state determiner 504 determines the state after receiving the search results and summarized query response, and as a direct result of receiving the search results and summarized query response.

The state determiner 504 may invoke a mode of the mobile computing device 500 depending on the state. For example, if a proximity sensor of the mobile computing device detects that the mobile computing device 500 is near an object when the search results and summarized query response are received, then a mode for audibly outputting information that is responsive to the search query may be invoked. If an external device that includes a speaker is communicatively connected to the mobile computing device, then the mode for audibly outputting information may be invoked. If the mobile computing device is determined to be docked, then a mode for outputting information may be invoked. If the mobile computing device is not determined to be in any of the above-described states, then a mode for visibly outputting information that is responsive to the search query may be invoked.

The query result presenter 506 may receive from the server system the search results and a summarized query response. The query result presenter 506 may perform operations for audibly and visually outputting the information, for example, as described with reference to FIGS. 2-4. As an example, the query result presenter 506 may determine to audibly output the summarized query response based on the mobile computing device being in the audible mode, as set by the state determiner 504.

In some examples, the received summarized query response may be audibly output by converting the text in the summarized query response to synthesized speech (e.g., by the mobile computing device alone or in communication with the server system 550). In some examples, the summarized query response includes data for presenting a visual depiction of the summarized query response, and data for audibly presenting the summarized query response (e.g., a voice recording or a set of text that is different than the data for presenting the visual depiction, and from which synthesized audio may be generated).

In some examples, audibly outputting the summarized query response includes the mobile computing device 500 applying, or requesting that the server system 550 apply, a template for generating synthesized speech from data in the summarized query response. For instance, a web page may be provided to the mobile computing device 500 in response to submission of a search query. The web page may include mark-up code for displaying multiple different search results, and mark-up code for displaying the summarized query response. The mobile computing device may use a template to convert the mark-up code for the summarized query response to text for generation of synthesized speech.

Referencing the above example where the "definition marmot" query is submitted, a template may be applied to the mark-up code that is used to generate the summarized query response. Application of the template may cause generation of the text "The definition for a Marmot is a stocky course-furred burrowing rodent with a short bushy tail." The generated text may be output as synthesized voice. In this example, the text that is generated using the template does not reference the icon or the source of the document (as presented in the visual depiction of the summarized query response), and adds the words "the" and "is." Thus, the template may place information that is for visually depicting the summarized query response into a form that is more understandable by a human listener.

The mobile computing device 500 includes a web browser 508. The web browser may include the query result presenter 506. In other words, the commands for presenting the audio output and visual output and the content that is defined by the audio output and visual output may be included in resources that the web browser 508 received from a server system in response to a request for resources at a specified URI.

Figure 6:
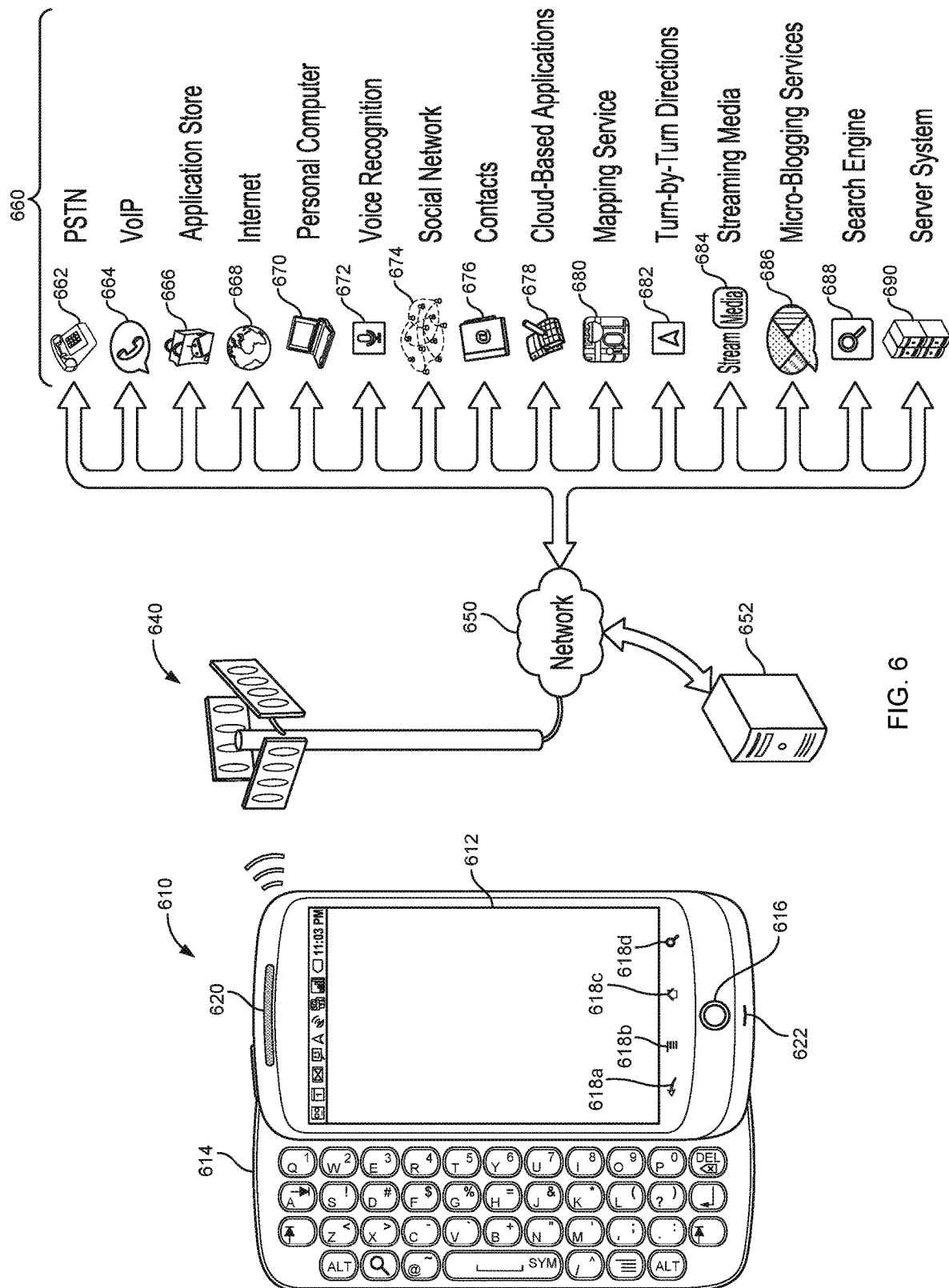
FIG. 6 is a conceptual diagram of a system that may be used to implement the systems and methods described in this document.

Referring now to FIG. 6, a conceptual diagram of a system that may be used to implement the systems and methods described in this document is illustrated. Mobile computing device 610 can wirelessly communicate with base station 640, which can provide the mobile computing device wireless access to numerous services 660 through a network 650.

In this illustration, the mobile computing device 610 is depicted as a handheld mobile telephone (e.g., a smartphone or an application telephone) that includes a touchscreen display device 612 for presenting content to a user of the mobile computing device 610. The mobile computing device 610 includes various input devices (e.g., keyboard 614 and touchscreen display device 612) for receiving user-input that influences the operation of the mobile computing device 610. In further implementations, the mobile computing device 610 may be a laptop computer, a tablet computer, a personal digital assistant, an embedded system (e.g., a car navigation system), a desktop computer, or a computerized workstation.

The mobile computing device 610 may include various visual, auditory, and tactile user-output mechanisms. An example visual output mechanism is display device 612, which can visually display video, graphics, images, and text that combine to provide a visible user interface. For example, the display device 612 may be a 3.7 inch AMO-LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 612). Further, the mobile computing device 610 may include one or more speakers 620 that convert an electrical signal into sound, for example, music, an audible alert, or voice of an individual in a telephone call.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user with capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
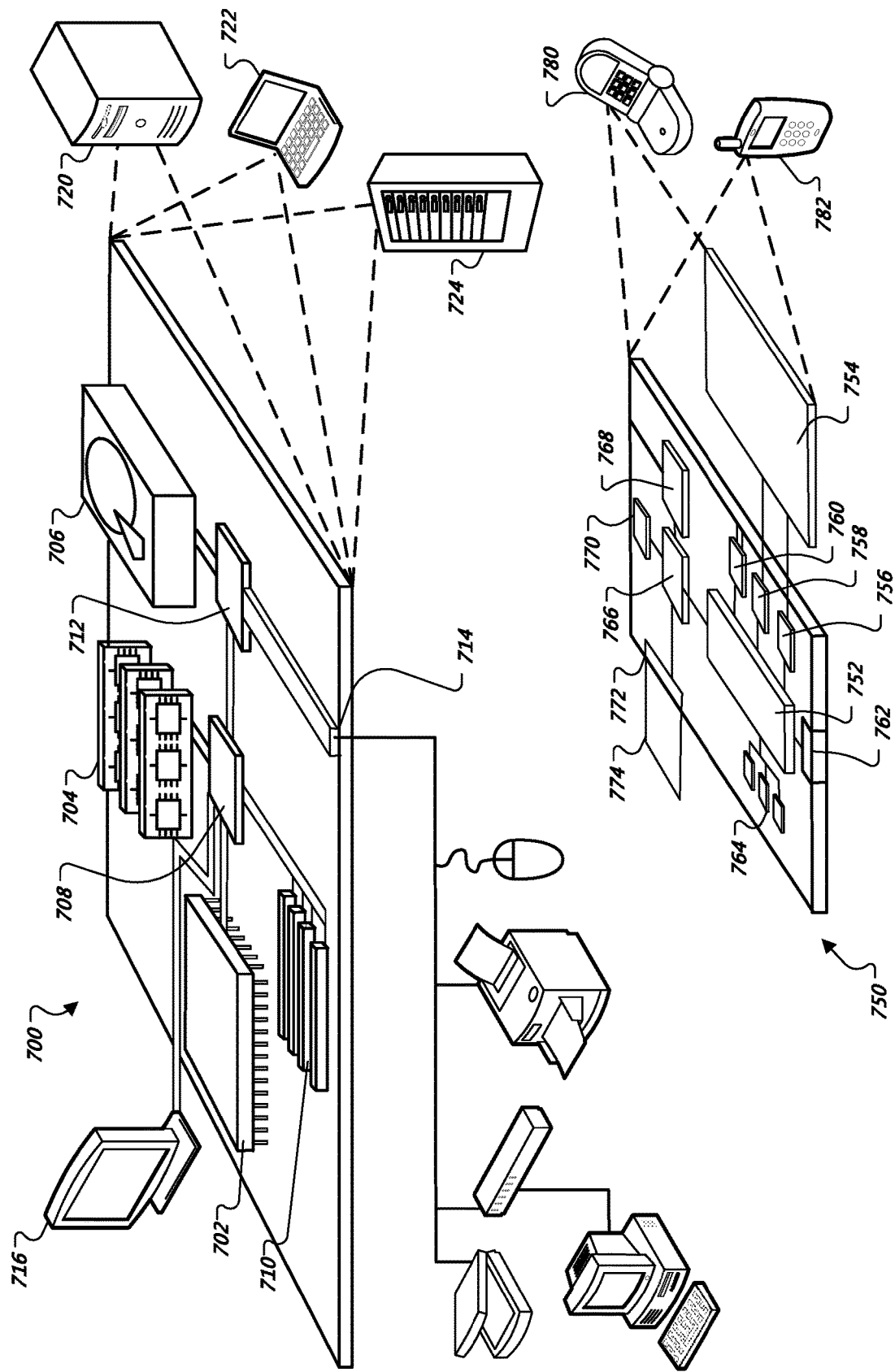
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method that when executed on data processing hardware of a user computing device causes the data processing hardware to perform operations comprising:
   recording a voice query spoken by a user of the user computing device;
   transmitting the voice query to a server system, the server system configured to:
      obtain a document that is determined to be responsive to the voice query; and
      generate, using a template and content from the document that is determined to be responsive to the voice query, a summarized query response, the summarized query response comprising:
         words that are specified by the template for generating the summarized query response; and
         a word that is not specified by the template for generating the summarized query response, but is instead included in the voice query spoken by the user;
   receiving, from the server system, visual representation data for presenting a textual representation of the summarized query response; and
   providing, for output on a display in communication with the data processing hardware, using the visual representation data, the textual representation of the summarized query response.

2. The computer-implemented method of claim 1, wherein the user computing device comprises the display.

3. The computer-implemented method of claim 1, wherein the display comprises an external display in communication with the user computing device.

4. The computer-implemented method of claim 1, wherein:
   the visual representation data received from the server system further comprises a link to the obtained document that is determined to be responsive to the voice query; and
   providing the textual representation of the summarized query response for output on the display further comprises providing, for output on the display, a graphical user interface element comprising the link to the obtained document that is determined to be responsive to the voice query.

5. The computer-implemented method of claim 4, wherein the operations further comprise:
   receiving a user input indication indicating selection of the graphical user interface element; and
   providing, for output on the display, the document that is determined to be responsive to the voice query in response to receiving the user input indication.

6. The computer-implemented method of claim 1, wherein the operations further comprise:

receiving, from the server system, audible representation data for providing an audible representation of the summarized query response; and providing, for output from the user computing device, the audible representation of the summarized query response.

7. The computer-implemented method of claim 6, wherein the server system is further configured to:

convert text in the summarized query response into synthesized speech, wherein the audible representation data comprises the synthesized speech.

8. The computer-implemented method of claim 6, wherein the server system is further configured to:

convert data for presenting a textual representation of the summarized query response into a set of text for generating synthesized speech, wherein:

the audible representation data comprises the set of text for generating the synthesized speech; and the operations further comprise generating the synthesized speech from the set of text, the synthesized speech comprising the audible representation of the summarized query response.

9. The computer-implemented method of claim 6, wherein providing the audible representation of the summarized query response comprises providing the audible representation of the summarized query response as synthesized speech audibly output from a remote speaker in communication with the user computing device.

10. The computer-implemented method of claim 6, wherein providing the audible representation of the summarized query response comprises providing the audible representation of the summarized query response as synthesized speech audibly output from a speaker of the user computing device.

11. A user computing device comprising:

data processing hardware; and memory hardware in communication with the data processing hardware and storing instructions that when executed on the data processing hardware cause the data processing hardware to perform operations comprising:

recording a voice query spoken by a user of the user computing device;

transmitting the voice query to a server system, the server system configured to:

obtain a document that is determined to be responsive to the voice query; and generate, using a template and content from the document that is determined to be responsive to the voice query, a summarized query response, the summarized query response comprising:

words that are specified by the template for generating the summarized query response; and a word that is not specified by the template for generating the summarized query response, but is instead included in the voice query spoken by the user;

receiving, from the server system, visual representation data for presenting a textual representation of the summarized query response; and providing, for output on a display in communication with the data processing hardware, using the visual representation data, the textual representation of the summarized query response.

12. The user computing device of claim 11, further comprising the display.

13. The user computing device of claim 11, wherein the display comprises an external display in communication with the user computing device.

14. The user computing device of claim 11, wherein:

the visual representation data received from the server system further comprises a link to the obtained document that is determined to be responsive to the voice query; and providing the textual representation of the summarized query response for output on the display further comprises providing, for output on the display, a graphical user interface element comprising the link to the obtained document that is determined to be responsive to the voice query.

15. The user computing device of claim 14, wherein the operations further comprise:

receiving a user input indication indicating selection of the graphical user interface element; and providing, for output on the display, the document that is determined to be responsive to the voice query in response to receiving the user input indication.

16. The user computing device of claim 11, wherein the operations further comprise:

receiving, from the server system, audible representation data for providing an audible representation of the summarized query response; and providing, for output from the user computing device, the audible representation of the summarized query response.

17. The user computing device of claim 16, wherein the server system is further configured to:

convert text in the summarized query response into synthesized speech, wherein the audible representation data comprises the synthesized speech.

18. The user computing device of claim 16, wherein the server system is further configured to:

convert data for presenting a textual representation of the summarized query response into a set of text for generating synthesized speech, wherein:

the audible representation data comprises the set of text for generating the synthesized speech; and the operations further comprise generating the synthesized speech from the set of text, the synthesized speech comprising the audible representation of the summarized query response.

19. The user computing device of claim 16, wherein providing the audible representation of the summarized query response comprises providing the audible representation of the summarized query response as synthesized speech audibly output from a remote speaker in communication with the user computing device.

20. The user computing device of claim 16, wherein providing the audible representation of the summarized query response comprises providing the audible representation of the summarized query response as synthesized speech audibly output from a speaker of the user computing device.

* * * * *